(12) United States Patent
Behravan et al.

(10) Patent No.: US 12,207,240 B2
(45) Date of Patent: Jan. 21, 2025

(54) HYBRID AUTOMATIC REPEAT REQUEST (HARQ) FEEDBACK FOR MULTIPLE PHYSICAL DOWNLINK SHARED CHANNEL (PDSCH) WITH DOWNLINK (DL) SEMI-PERSISTENT SCHEDULING

(71) Applicant: Telefonaktiebolaget LM Ericsson (publ), Stockholm (SE)

(72) Inventors: Ali Behravan, Stockholm (SE); Sorour Falahati, Stockholm (SE); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 532 days.

(21) Appl. No.: 17/607,789

(22) PCT Filed: Apr. 30, 2020

(86) PCT No.: PCT/SE2020/050436
§ 371 (c)(1),
(2) Date: Oct. 29, 2021

(87) PCT Pub. No.: WO2020/222693
PCT Pub. Date: Nov. 5, 2020

(65) Prior Publication Data
US 2022/0232564 A1 Jul. 21, 2022

Related U.S. Application Data

(60) Provisional application No. 62/842,053, filed on May 2, 2019.

(51) Int. Cl.
*H04W 72/0446* (2023.01)
*H04L 1/1812* (2023.01)
*H04L 1/1829* (2023.01)

(52) U.S. Cl.
CPC ....... *H04W 72/0446* (2013.01); *H04L 1/1812* (2013.01); *H04L 1/1854* (2013.01)

(58) Field of Classification Search
CPC ... H04L 1/1812; H04L 12/28; H04W 72/0446
(Continued)

(56) References Cited

U.S. PATENT DOCUMENTS

2010/0316096 A1* 12/2010 Adjakple ............... H04L 1/1887
375/211
2023/0345474 A1* 10/2023 Ma ........................ H04W 72/232

FOREIGN PATENT DOCUMENTS

CN 102781103 A 11/2012
CN 110830176 A 2/2020
(Continued)

OTHER PUBLICATIONS

Author Unknown, "Technical Specification Group Radio Access Network; NR; Physical layer procedures for control (Release 15)," Technical Specification 38.213, Version 15.5.0, 3GPP Organizational Partners, Mar. 2019, 104 pages.
(Continued)

*Primary Examiner* — Dang T Ton
(74) *Attorney, Agent, or Firm* — Withrow & Terranova, PLLC

(57) ABSTRACT

A method and apparatus are disclosed for downlink semi-persistent scheduling configuration. In one embodiment, a method for a wireless device (WD) includes receiving at least one downlink, DL, semi-persistent scheduling, SPS, configuration; using at least one HARQ timing offset value out of a plurality of HARQ timing offset values corresponding to the at least one DL SPS configuration to determine an uplink, UL, slot to send HARQ feedback for a plurality of physical downlink shared channel, PDSCH, transmissions, the plurality of PDSCH transmissions being associated with the at least one DL SPS configuration; and optionally, sending the HARQ feedback based at least in part on the at least one HARQ timing offset value. In one embodiment, a method for a network node includes sending at least one downlink, DL, semi-persistent scheduling, SPS, configuration.

26 Claims, 13 Drawing Sheets

(58) Field of Classification Search
USPC .................................. 370/329, 400, 395
See application file for complete search history.

(56) References Cited

FOREIGN PATENT DOCUMENTS

| EA | 029704 B1 | 5/2018 |
|----|-----------|--------|
| WO | 2018171927 A1 | 9/2018 |
| WO | 2019028857 A1 | 2/2019 |

OTHER PUBLICATIONS

Ericsson, "R1-1807582: RAN1 decisions for WI Shortened TTI and processing time for LTE (LTE_sTTIandPT)," 3GPP TSG RAN WG1 Meeting #93, May 21-25, 2018, Busan, South Korea, 13 pages.
Intel Corporation, "R1-1904306: On enhancements to UCI for eURLLC," 3GPP TSG RAN WG1 #96bis, Apr. 8-12, 2019, Xi'an, China, 9 pages.
NTT Docomo, Inc., "R2-1903584: SPS enhancements for TSC traffic," 3GPP TSG-RAN WG2 #105bis, Apr. 8-12, 2019, Xi'an, China, 4 pages.
Oppo, "R1-1906448: UCI enhancements for URLLC," 3GPP TSG RAN WG1 #97, May 13-17, 2019, Reno, Nevada, 8 pages.
Samsung, "R1-1904446: On scheduling/HARQ enhancements for IIoT," 3GPP TSG RAN WG1 #96bis, Apr. 8-12, 2019, Xi'an, China, 5 pages.
International Search Report and Written Opinion for International Patent Application No. PCT/SE2020/050436, mailed Aug. 3, 2020, 13 pages.
First Office Action for Chinese Patent Application No. 202080031749.6, mailed Aug. 15, 2023, 12 pages.
Office Action for Russian Patent Application No. 2021134822, mailed Mar. 2, 2022, 16 pages.

* cited by examiner

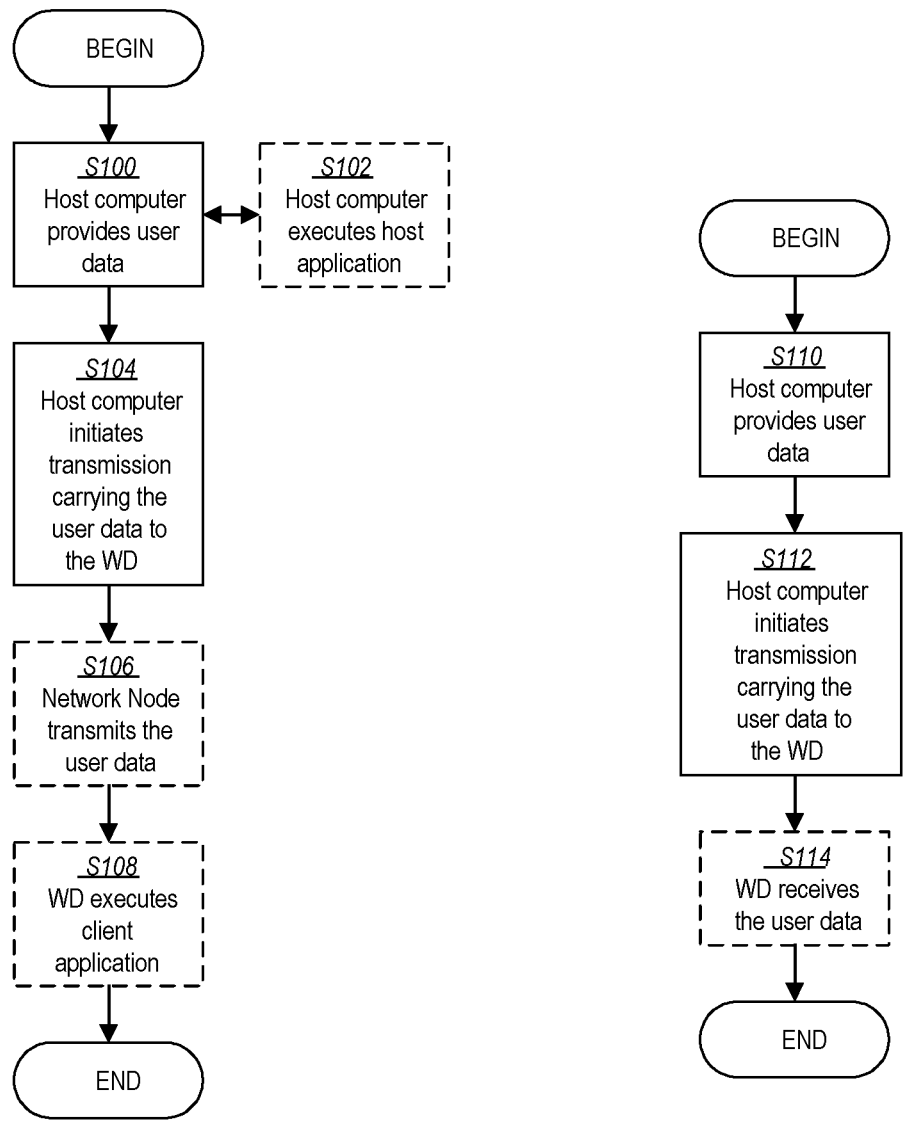

HYBRID AUTOMATIC REPEAT REQUEST (HARQ) FEEDBACK FOR MULTIPLE PHYSICAL DOWNLINK SHARED CHANNEL (PDSCH) WITH DOWNLINK (DL) SEMI-PERSISTENT SCHEDULING

This application is a 35 U.S.C. § 371 national phase filing of International Application No. PCT/SE2020/050436, filed Apr. 30, 2020, which claims the benefit of provisional patent application Ser. No. 62/842,053, filed May 2, 2019 the disclosures of which are incorporated herein by reference in their entireties.

TECHNICAL FIELD

The present disclosure relates to wireless communications and, in particular, to Hybrid Automatic Repeat reQuest (HARQ) feedback for multiple Physical Downlink Shared Channels (PDSCH) with downlink (DL) semi-persistent scheduling (SPS).

BACKGROUND

The New Radio (NR) standard (also known as "5G") of the Third Generation Partnership Project (3GPP) is designed to provide service for multiple use cases such as enhanced mobile broadband (eMBB), ultra-reliable and low latency communication (URLLC) (also called high-reliable low latency communication), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR, in addition to transmission in a slot, a mini-slot transmission is also allowed to reduce latency. A mini-slot is a concept that is used in scheduling and in downlink (DL) a min-slot can include 2, 4 or 7 orthogonal frequency division multiplexing (OFDM) symbols, while in uplink (UL) a mini-slot can be any number of 1 to 14 OFDM symbols. It should be noted that the concepts of slot and mini-slot are not specific to a specific service, meaning that a mini-slot may be used for either eMBB, URLLC, or other services. FIG. 1 illustrates an example of radio resources in NR with subcarrier spacing of 15 kHz.

Downlink Control Information

In the 3GPP NR standard, downlink (DL) control information which is transmitted in physical downlink control channel (PDCCH), may be used to indicate the DL data related information, UL related information, power control information, slot format indication, etc. There are different formats of DL control information associated with each of these control signals and the wireless device (WD) (e.g., user equipment (UE)) can identify the DL control information based on different radio network temporary identifiers (RNTIs).

A WD may be configured by higher layer signaling to monitor for DCIs in different resources with different periodicities, etc. DCI formats 1_0 and 1_1 are used for scheduling DL data which is sent in physical downlink shard channel (PDSCH), and includes time and frequency resources for DL transmission, as well as, modulation and coding information, HARQ (hybrid automatic repeat request) information, etc.

In case of DL semi-persistent scheduling (SPS) of PDSCH and UL configured grant type 2, part of the scheduling including the periodicity is provided by the higher layer configurations (e.g., radio resource control signaling), while the rest of scheduling information such as time domain and frequency domain resource allocation, modulation and coding, etc., are provided by the DCI in PDCCH.

HARQ Feedback

Generally, the procedure for receiving downlink transmission is that the WD first monitors and decodes a PDCCH in slot n, which points to a DL data scheduled in slot n+K0 slots (K0 is larger than or equal to 0). The WD then decodes the data in the corresponding PDSCH. Finally, based on the outcome of the decoding the WD sends an acknowledgement of the correct decoding (ACK) or a negative acknowledgement (NACK) to the network node (e.g., gNB) at time slot n+K0+K1. Both of K0 and K1 are indicated in the downlink DCI. The resources for sending the acknowledgement are indicated by the physical uplink control channel (PUCCH) resource indicator (PRI) field in PDCCH which points to one of the PUCCH resources that is configured by higher layers. Depending on DL/UL slot configurations, or whether carrier aggregation, or per code-block group (CBG) transmission used in the DL, the feedback for several PDSCHs may be multiplexed in one feedback message. This is accomplished by constructing HARQ-ACK codebooks.

According to 3GPP Release 15 (Rel-15), for a SPS PDSCH reception ending in slot n, the WD transmits the PUCCH in slot n+k where k is provided by the PDSCH-to-HARQ-timing-indicator field in DCI format 10 or, if present, in DCI format 1_1 activating the SPS PDSCH reception. If the WD detects a DCI format 1_1 that does not include a PDSCH-to-HARQ-timing-indicator field and schedules a PDSCH reception or activates a SPS PDSCH reception ending in slot n, the WD provides corresponding HARQ-ACK information in a PUCCH transmission within slot n+k where k is provided by dl-DataToUL-ACK (3GPP Technical Specification (TS) 38.213).

FIG. 2 shows an example where the periodicity of DL SPS is equal to 10 slots (as shown where a first PDSCH is at slot n and then a subsequent PDSCH is at slot n+10), and K1 which is the offset to the HARQ feedback transmission is equal to 1.

In cases where a WD receives only DL SPS PDSCH(s), the corresponding HARQ-ACK would be sent in a PUCCH resource provided by the higher layer parameter n1PUCCH-AN. This format of this PUCCH resource is 0 or 1 which means that the resource can carry a maximum of 2 HARQ-ACK bits.

In cases where a WD receives DL SPS PDSCH(s) and PDSCH(s) scheduled by DCI, and all are acknowledged in the same slot, the corresponding HARQ-ACK would be included in the same codebook. The number of HARQ-ACK bits corresponding to DL SPS per cell is one bit and is added to the corresponding dynamic codebook. For semi-static configured codebook, SPS uses one of the bits for dynamically scheduled PDSCH (e.g., PDSCH scheduled by DCI) since the WD cannot receive dynamically scheduled PDSCH and a SPS PDSCH with the same time-domain resource allocation.

It has been proposed that shorter periodicities down to multiple symbols for DL SPS be supported where in 3GPP Rel-15, the smallest periodicity is 10 ms, as shown in the example code below.

```
--ASN1START
--TAG-SPS-CONFIG-START
SPS-Config : :=          SEQUENCE {
    Periodicity          ENUMERATED    {ms10, ms20,
ms32, ms40, ms64, ms80, ms320, ms640,
                                       spare6, spare5,
spare4, spare3, spare2, spare1},
    nrofHARQ-Processes   INTEGER (1..8),
    n1PUCCH-AN           PUCCH-ResourceId
OPTIONAL,                -- Need M
    mcs-Table            ENUMERATED {qam64LowSE}
OPTIONAL,                -- Need S
    ...
}
```

Unfortunately, existing HARQ designs may not be able to support those shorter SPS periodicities.

SUMMARY

Some embodiments advantageously provide methods and apparatuses to support shorter SPS periodicities.

In one embodiment, a method implemented in a network node is provided. The method includes sending at least one downlink (DL) semi-persistent scheduling (SPS) configuration corresponding to at least one Hybrid Automatic Repeat reQuest (HARQ) timing offset value; optionally, sending at least one physical downlink shared channel (PDSCH) associated with the at least one DL SPS configuration; and receiving HARQ feedback according to one or more of the at least one DL SPS configuration and the at least one HARQ timing offset value.

In another embodiment, a method implemented in a wireless device (WD) is provided. The method includes receiving at least one downlink (DL) semi-persistent scheduling (SPS) configuration corresponding to at least one Hybrid Automatic Repeat reQuest (HARQ) timing offset value; using the at least one HARQ timing offset value to determine an uplink (UL) slot to send HARQ feedback for at least one physical downlink shared channel (PDSCH) associated with the at least one DL SPS configuration; and optionally, sending the HARQ feedback according to one or more of the at least one DL SPS configuration and the at least one HARQ timing offset value.

According to one aspect of the present disclosure, a method implemented in a wireless device, WD, is provided. The method includes receiving at least one downlink, DL, semi-persistent scheduling, SPS, configuration; using at least one HARQ timing offset value out of a plurality of HARQ timing offset values corresponding to the at least one DL SPS configuration to determine an uplink, UL, slot to send HARQ feedback for a plurality of physical downlink shared channel, PDSCH, transmissions, the plurality of PDSCH transmissions being associated with the at least one DL SPS configuration; and optionally, sending the HARQ feedback based at least in part on the at least one HARQ timing offset value.

In some embodiments of this aspect, a periodicity of at least one of the at least one DL SPS configuration is at least one of: two or more orthogonal frequency division multiplexing, OFDM, symbols; and less than 10 milliseconds. In some embodiments of this aspect, the HARQ feedback is for the plurality of PDSCH transmissions within a single slot. In some embodiments of this aspect, the at least one DL SPS configuration includes a plurality of DL SPS configurations, each of the plurality of DL SPS configurations corresponding to a different HARQ timing offset value. In some embodiments of this aspect, the at least one DL SPS configuration includes a plurality of sub-sets of DL SPS transmission opportunities, each of the plurality of sub-sets of DL SPS transmission opportunities corresponding to a different HARQ timing offset value. In some embodiments of this aspect, the at least one DL SPS configuration includes a plurality of bitmaps, each of the plurality of bitmaps associated with a different HARQ timing offset value.

In some embodiments of this aspect, using the at least one HARQ timing offset value includes determining the at least one HARQ timing offset value based at least in part on a HARQ timing offset value for a last PDSCH within a PDSCH window. In some embodiments of this aspect, using the at least one HARQ timing offset value further includes disregarding at least one HARQ timing offset value for at least one earlier PDSCH within the PDSCH window. In some embodiments of this aspect, using the at least one HARQ timing offset value includes determining whether the at least one HARQ timing offset value indicates a DL slot and if the at least one HARQ timing offset value indicates the DL slot, postponing sending the HARQ feedback until a first slot with an UL allocation. In some embodiments of this aspect, the at least one HARQ timing offset value is indicated via one of radio resource control (RRC) signaling and at least one downlink control information (DCI) message.

According to another aspect of the present disclosure, a method implemented in a network node configured to communicate with a wireless device, WD, is provided. The method includes sending at least one downlink, DL, semi-persistent scheduling, SPS, configuration; optionally, sending a plurality of physical downlink shared channel, PDSCH, transmissions associated with the at least one DL SPS configuration; determining at least one HARQ timing offset value out of a plurality of HARQ timing offset values corresponding to the at least one DL SPS configuration; and receiving HARQ feedback for the plurality of PDSCH transmissions based at least in part on the at least one HARQ timing offset value.

In some embodiments of this aspect, a periodicity of at least one of the at least one DL SPS configuration is at least one of: two or more orthogonal frequency division multiplexing, OFDM, symbols; and less than 10 milliseconds. In some embodiments of this aspect, the HARQ feedback is for the plurality of PDSCH transmissions within a single slot. In some embodiments of this aspect, the at least one DL SPS configuration includes a plurality of DL SPS configurations, each of the plurality of DL SPS configurations corresponding to a different HARQ timing offset value. In some embodiments of this aspect, the at least one DL SPS configuration includes a plurality of sub-sets of DL SPS transmission opportunities, each of the plurality of sub-sets of DL SPS transmission opportunities corresponding to a different HARQ timing offset value.

In some embodiments of this aspect, the at least one DL SPS configuration includes a plurality of bitmaps, each of the plurality of bitmaps associated with a different HARQ timing offset value. In some embodiments of this aspect, determining the at least one HARQ timing offset value includes determining the at least one HARQ timing offset value based at least in part on a HARQ timing offset value for a last PDSCH within a PDSCH window. In some embodiments of this aspect, determining the at least one HARQ timing offset value further includes determining the at least one HARQ timing offset value based at least in part on at least one HARQ timing offset value for at least one earlier PDSCH within the PDSCH window being disregarded. In some embodiments of this aspect, receiving HARQ feedback further includes determining whether the at least one HARQ timing offset value indicates a DL slot and if the at least one HARQ timing offset value indicates the DL slot, postponing receiving the HARQ feedback until a first slot with an UL allocation. In some embodiments of this aspect, the method further includes indicating the at least one HARQ timing offset value via one of radio resource control (RRC) signaling and at least one downlink control information (DCI) message.

According to yet another aspect of the present disclosure, a wireless device, WD, configured to communicate with a network node is provided. The WD includes processing circuitry. The processing circuitry is configured to cause the WD to receive at least one downlink, DL, semi-persistent scheduling, SPS, configuration; use at least one HARQ timing offset value out of a plurality of HARQ timing offset values corresponding to the at least one DL SPS configuration to determine an uplink, UL, slot to send HARQ feedback for a plurality of physical downlink shared channel, PDSCH, transmissions, the plurality of PDSCH transmissions being associated with the at least one DL SPS configuration; and optionally, send the HARQ feedback based at least in part on the at least one HARQ timing offset value.

In some embodiments of this aspect, a periodicity of at least one of the at least one DL SPS configuration is at least one of: two or more orthogonal frequency division multiplexing, OFDM, symbols; and less than 10 milliseconds. In some embodiments of this aspect, the HARQ feedback is for the plurality of PDSCH transmissions within a single slot. In some embodiments of this aspect, the at least one DL SPS configuration includes a plurality of DL SPS configurations, each of the plurality of DL SPS configurations corresponding to a different HARQ timing offset value. In some embodiments of this aspect, the at least one DL SPS configuration includes a plurality of sub-sets of DL SPS transmission opportunities, each of the plurality of sub-sets of DL SPS transmission opportunities corresponding to a different HARQ timing offset value. In some embodiments of this aspect, the at least one DL SPS configuration includes a plurality of bitmaps, each of the plurality of bitmaps associated with a different HARQ timing offset value.

In some embodiments of this aspect, the processing circuitry is configured to use the at least one HARQ timing offset value by being configured to determine the at least one HARQ timing offset value based at least in part on a HARQ timing offset value for a last PDSCH within a PDSCH window. In some embodiments of this aspect, the processing circuitry is configured to use the at least one HARQ timing offset value by being configured to disregard at least one HARQ timing offset value for at least one earlier PDSCH within the PDSCH window. In some embodiments of this aspect, the processing circuitry is configured to use the at least one HARQ timing offset value by being configured to determine whether the at least one HARQ timing offset value indicates a DL slot and if the at least one HARQ timing offset value indicates the DL slot, postponing sending the HARQ feedback until a first slot with an UL allocation. In some embodiments of this aspect, the at least one HARQ timing offset value is indicated via one of radio resource control (RRC) signaling and at least one downlink control information (DCI) message.

According to another aspect of the present disclosure, a network node configured to communicate with a wireless device, WD, is provided. The network node includes processing circuitry. The processing circuitry is configured to cause the network node to send at least one downlink, DL, semi-persistent scheduling, SPS, configuration; optionally, send a plurality of physical downlink shared channel, PDSCH, transmissions associated with the at least one DL SPS configuration; determine at least one HARQ timing offset value out of a plurality of HARQ timing offset values corresponding to the at least one DL SPS configuration; and receive HARQ feedback for the plurality of PDSCH transmissions based at least in part on the at least one HARQ timing offset value.

In some embodiments of this aspect, a periodicity of at least one of the at least one DL SPS configuration is at least one of: two or more orthogonal frequency division multiplexing, OFDM, symbols; and less than 10 milliseconds. In some embodiments of this aspect, the HARQ feedback is for the plurality of PDSCH transmissions within a single slot. In some embodiments of this aspect, the at least one DL SPS configuration includes a plurality of DL SPS configurations, each of the plurality of DL SPS configurations corresponding to a different HARQ timing offset value. In some embodiments of this aspect, the at least one DL SPS configuration includes a plurality of sub-sets of DL SPS transmission opportunities, each of the plurality of sub-sets of DL SPS transmission opportunities corresponding to a different HARQ timing offset value. In some embodiments of this aspect, the at least one DL SPS configuration includes a plurality of bitmaps, each of the plurality of bitmaps associated with a different HARQ timing offset value.

In some embodiments of this aspect, the processing circuitry is configured to determine the at least one HARQ timing offset value by being configured to determine the at least one HARQ timing offset value based at least in part on a HARQ timing offset value for a last PDSCH within a PDSCH window. In some embodiments of this aspect, the processing circuitry is configured to determine the at least one HARQ timing offset value by being configured to determine the at least one HARQ timing offset value based at least in part on at least one HARQ timing offset value for at least one earlier PDSCH within the PDSCH window being disregarded. In some embodiments of this aspect, the processing circuitry is configured to receive the HARQ feedback by being configured to determine whether the at least one HARQ timing offset value indicates a DL slot and if the at least one HARQ timing offset value indicates the DL slot, postponing receiving the HARQ feedback until a first slot with an UL allocation. In some embodiments of this aspect, the processing circuitry is further configured to cause the network node to indicate the determined at least one HARQ timing offset value via one of radio resource control (RRC) signaling and at least one downlink control information (DCI) message.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart illustrating example methods implemented in a communication system including a host computer, a network node and a wireless device for executing a client application at a wireless device according to some embodiments of the present disclosure;

FIG. 7 is a flowchart illustrating example methods implemented in a communication system including a host computer, a network node and a wireless device for receiving user data at a wireless device according to some embodiments of the present disclosure;

DETAILED DESCRIPTION

Figure 1:
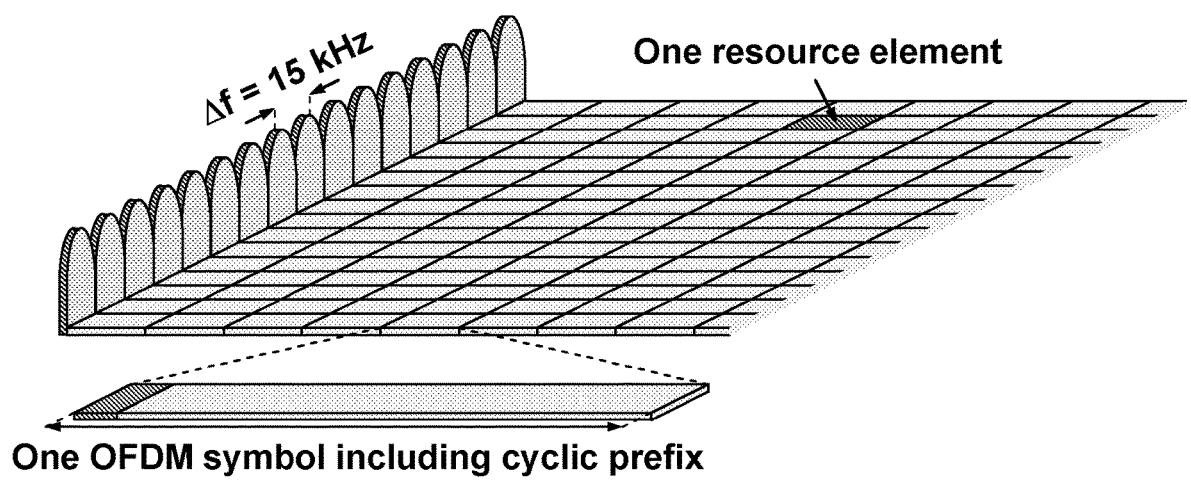
FIG. 1 illustrates an example of radio resource in NR with subcarrier spacing of 15 kHz.
Figure 2:
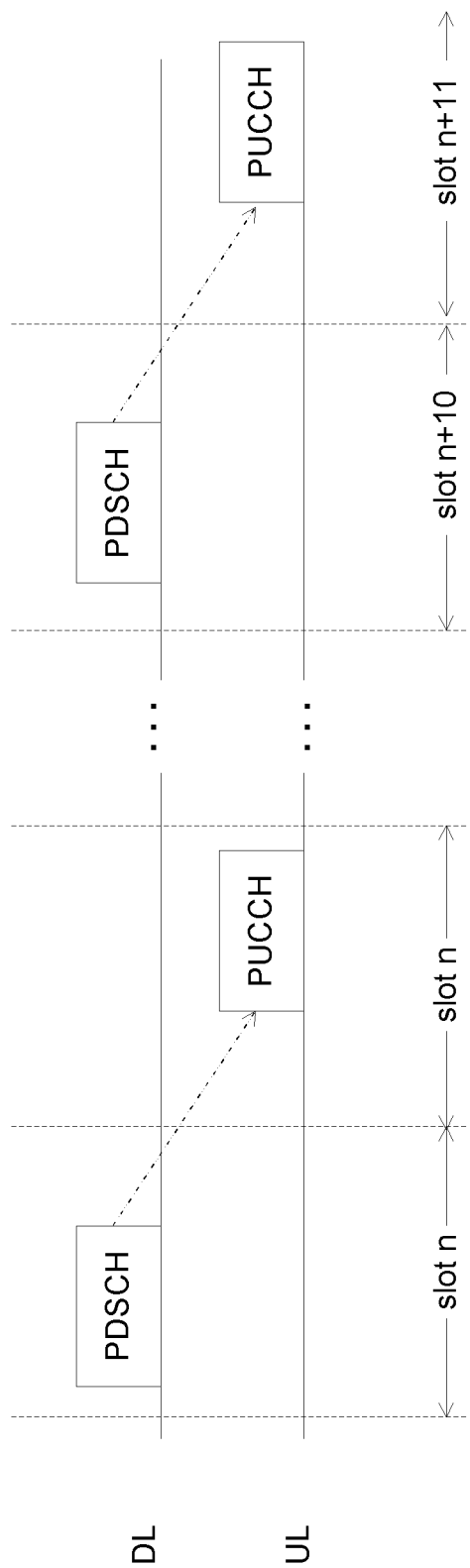
FIG. 2 illustrates an example of feedback for DL SPS being sent with periodicity of 10 slots and feedback sent at K1=1 slot later.
Figure 3:
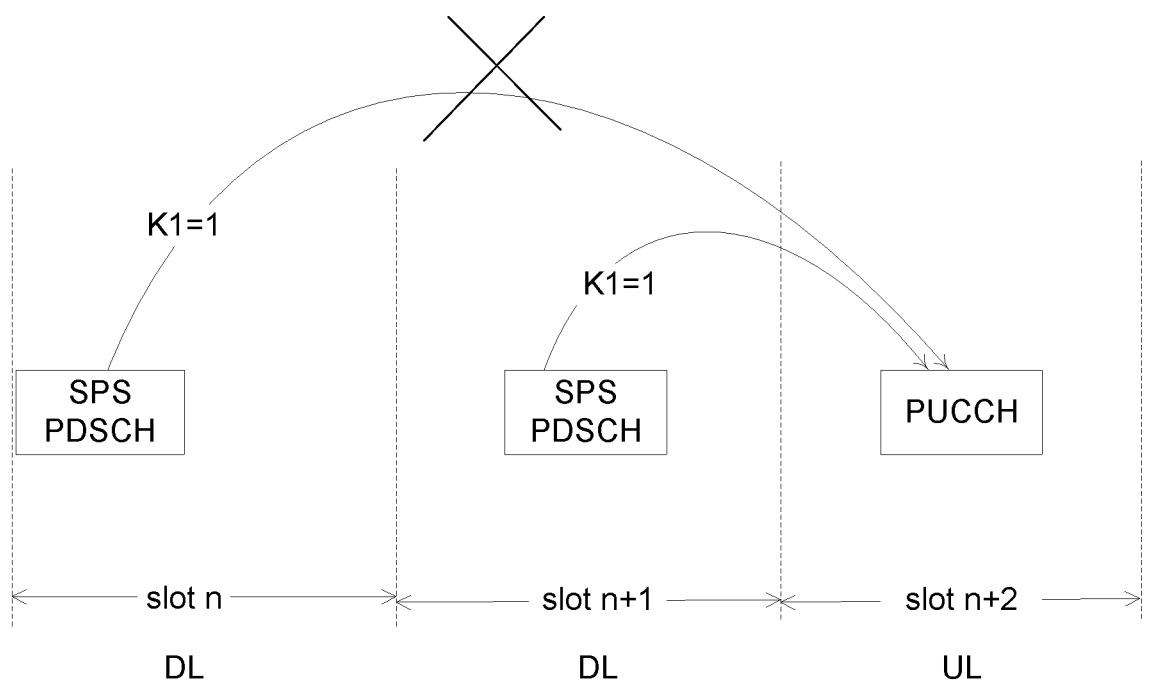
FIG. 3 illustrates an example of two consecutive DL SPS with one HARQ feedback in a following UL slot, which is a use case not supported in the existing NR standard.

In some existing networks, HARQ design may not be able to support shorter SPS periodicities. For example, both PDSCH-to-HARQ-timing-indicator field in the activation DCI, and dl-DataToUL-ACK parameter in RRC configuration, are fixed values that determine the offset between a DL SPS and the corresponding HARQ feedback. Given the periodicities for 3GPP Rel-15 being at least 10 ms, for the case of only DL SPS transmission, it is feasible with a proper K1 value, to ensure that the configured PUCCH can be transmitted in a slot to carry the one bit HARQ-ACK feedback for the corresponding DL SPS. However, in some new DL SPS scenarios with smaller periodicities, such as 1 ms or smaller, or some TDD scenarios, a single fixed offset between DL SPS PDSCH and the UL HARQ cannot work. One example is a time division duplex (TDD) configuration with SPS in multiple consecutive DL slots, where a single feedback message has to carry the HARQ feedback for all the DL slots. FIG. 3 shows an example with a TDD scenario with two consecutive DL and one UL slot, and two SPS PDSCHs in the DL slots based on a periodicity of one slot. In this example case, only one of the DL SPS can be acknowledged. For example, as shown in FIG. 3, two different K1 values are needed to point to the HARQ feedback slot, but in DL SPS activation it is only possible to indicate one value. The example of FIG. 3 shows that K1=1 works for the second DL slot, but it does not work for the first DL slot.

Another example is the case of multiple DL SPS in one slot, i.e. SPS periodicity of less than one slot, where the feedback for some of the early SPS PDSCHs can be sent in a following UL slot or sub-slot, while the feedback for late SPS PDSCHs in the same slot cannot be sent in a following UL slot or sub-slot due to fixed timing between the end of a DL SPS and the UL slot or UL sub-slot that is going to include a PUCCH for carrying feedback.

Thus, some embodiments of the present disclosure enable HARQ feedback for multiple semi-persistently scheduled PDSCHs belonging to a DL SPS configuration with a periodicity smaller than those specified in 3GPP Rel-15. For example, some embodiments include one or more of the following:

Realizing a DL SPS with periodicities smaller than those of 3GPP Rel-15 (e.g., less than 10 ms) by configuring multiple DL SPS configurations corresponding to different K1 values and using each configuration to provide feedback for a certain PDSCH-to-HARQ offset.

Realizing a DL SPS with periodicities smaller than those of Rel-15 by configuration a DL SPS and partitioning the transmission opportunities into different sub-sets, where each sub-set corresponds to a different K1 value.

Realizing a DL SPS with periodicities smaller than those of 3GPP Rel-15 by constructing different bitmap patterns where each bitmap corresponds to a different K1 offsets. The bitmaps indicate which slots should get a certain K1 values.

Realizing a DL SPS with periodicities smaller than of 3GPP Rel-15 by determining the slot for feedback based on the K1 value for the latest PDSCH in an aggregated DL slots that determine the corresponding HARQ associated the PDSCH window. In this method, all the K1 values corresponding to earlier PDSCHs in the window may be disregarded.

Some embodiments of the present disclosure advantageously make it possible to indicate HARQ ACK feedback for a DL SPS configuration, particularly those with periodicity smaller than e.g., the ones defined in 3GPP Rel-15 (e.g., less than 10 ms, or in some TDD scenarios).

Before describing in detail exemplary embodiments, it is noted that the embodiments reside primarily in combinations of apparatus components and processing steps related to HARQ feedback for multiple PDSCH with DL semi-persistent scheduling (SPS). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a" "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the terms "HARQ timing offset value", K1, k, "PDSCH to HARQ offset," "offset", "K1 offset" may be used herein interchangeably to indicate a timing offset value from a PDSCH to the corresponding UL HARQ feedback.

In some embodiments, the DL SPS configuration includes a periodicity and/or indicates a corresponding K1 value.

Note that although the examples herein may be described in terms of slots, it should be understood that the techniques may be applied to other types of resources, such as, for example, mini-slots, symbols, transmission interval, subframe, other types of radio communication resources and the like. In some embodiments, the terms "slot", "mini-slot", and the like may be used interchangeably.

Although the description herein may be explained in the context of PDSCH and/or feedback in a PUCCH, it should be understood that the principles may also be applicable to other channels and that implementations are not limited to PDSCH and/or PUCCH. Also, any two or more embodiments described in this disclosure may be combined in any way with each other.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Receiving (or obtaining) control information may comprise receiving one or more control information messages (e.g., an RRC parameter such as DL SPS periodicity). It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

Sending/transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device (WD) or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device (e.g., DL SPS configuration). Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

A data transmission (e.g., PDSCH) may represent and/or pertain to transmission of specific data, e.g. a specific block of data and/or transport block.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 4:
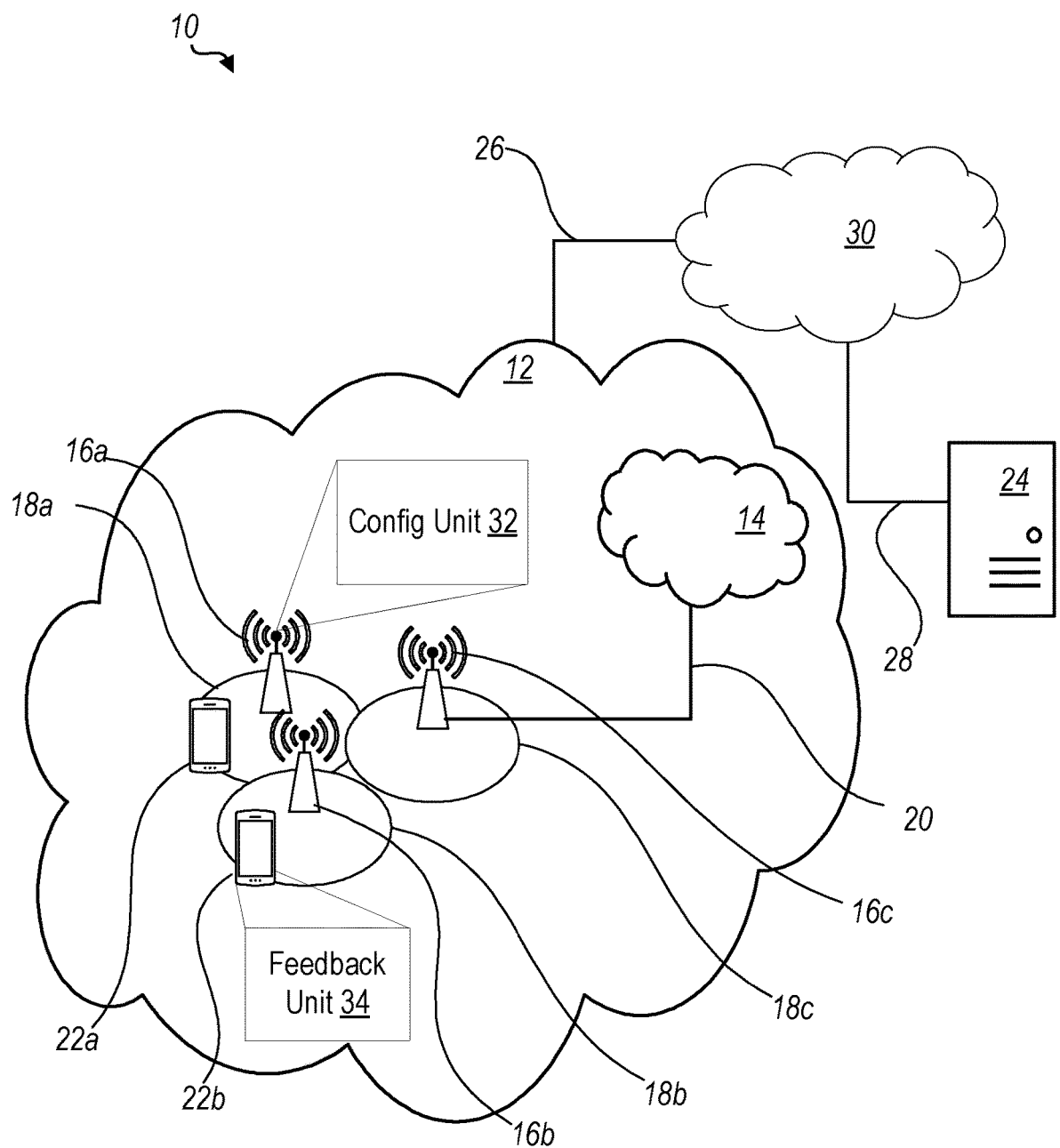
FIG. 4 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a configuration unit 32 which is configured to send at least one downlink, DL, semi-persistent scheduling, SPS, configuration; optionally, send a plurality of physical downlink shared channel, PDSCH, transmissions associated with the at least one DL SPS configuration; determine at least one HARQ timing offset value out of a plurality of HARQ timing offset values corresponding to the at least one DL SPS configuration; and receive HARQ feedback for the plurality of PDSCH transmissions based at least in part on the at least one HARQ timing offset value In some embodiments, a network node 16 includes a configuration unit 32 which is configured to send at least one downlink (DL) semi-persistent scheduling (SPS) configuration corresponding to at least one Hybrid Automatic Repeat reQuest (HARQ) timing offset value; optionally, send at least one physical downlink shared channel (PDSCH) associated with the at least one DL SPS configuration; and receive HARQ feedback according to one or more of the at least one DL SPS configuration and the at least one HARQ timing offset value.

A wireless device 22 is configured to include a feedback unit 34 which is configured to receive at least one downlink, DL, semi-persistent scheduling, SPS, configuration; use at least one HARQ timing offset value out of a plurality of HARQ timing offset values corresponding to the at least one DL SPS configuration to determine an uplink, UL, slot to send HARQ feedback for a plurality of physical downlink shared channel, PDSCH, transmissions, the plurality of PDSCH transmissions being associated with the at least one DL SPS configuration; and optionally, send the HARQ feedback based at least in part on the at least one HARQ timing offset value.

In some embodiments, a wireless device 22 includes a feedback unit 34 which is configured to receive at least one downlink (DL) semi-persistent scheduling (SPS) configuration corresponding to at least one Hybrid Automatic Repeat reQuest (HARQ) timing offset value; use the at least one HARQ timing offset value to determine an uplink (UL) slot to send HARQ feedback for at least one physical downlink shared channel (PDSCH) associated with the at least one DL SPS configuration; and optionally, send the HARQ feedback according to one or more of the at least one DL SPS configuration and the at least one HARQ timing offset value.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to send at least one downlink (DL) semi-persistent scheduling (SPS) configuration corresponding to at least one Hybrid Automatic Repeat reQuest (HARQ) timing offset value; optionally, send at least one physical downlink shared channel (PDSCH) associated with the at least one DL SPS configuration; and receive HARQ feedback according to one or more of the at least one DL SPS configuration and the at least one HARQ timing offset value.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a feedback unit 34 configured to receive at least one downlink (DL) semi-persistent scheduling (SPS) configuration corresponding to at least one Hybrid Automatic Repeat reQuest (HARQ) timing offset value; use the at least one HARQ timing offset value to determine an uplink (UL) slot to send HARQ feedback for at least one physical downlink shared channel (PDSCH) associated with the at least one DL SPS configuration; and optionally, send the HARQ feedback according to one or more of the at least one DL SPS configuration and the at least one HARQ timing offset value.

Figure 5:
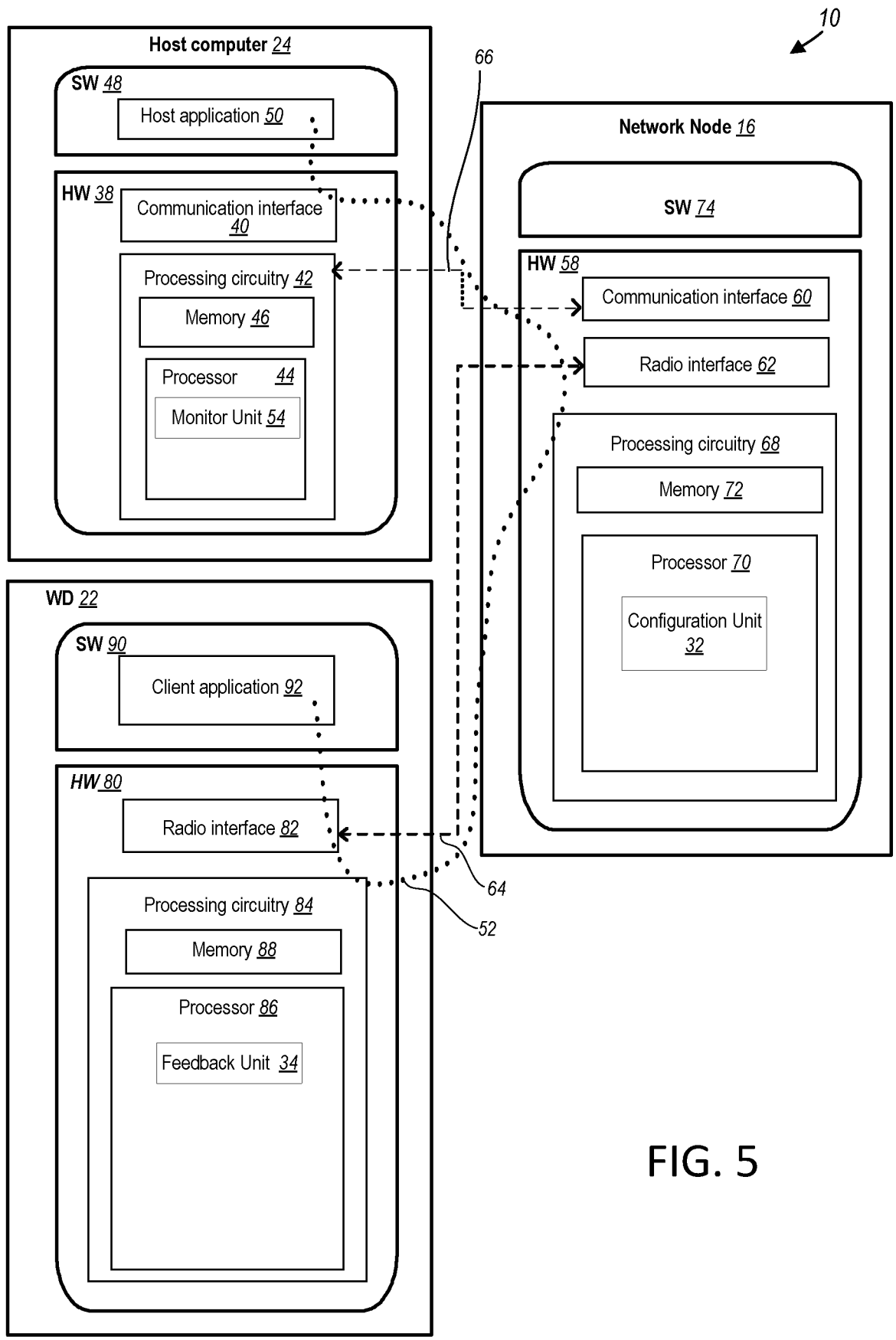
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as configuration unit 32, and feedback unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 8:
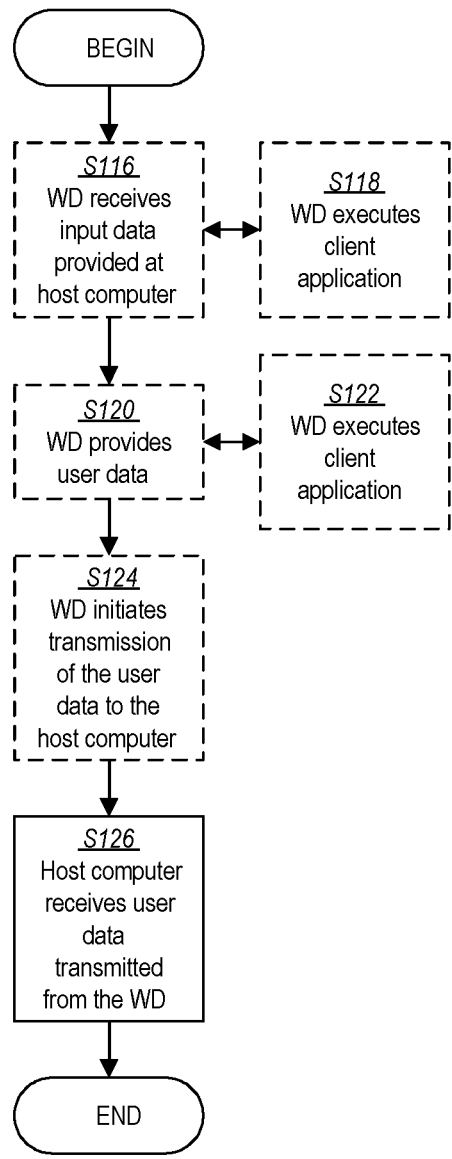
FIG. 8 is a flowchart illustrating example methods implemented in a communication system including a host computer, a network node and a wireless device for receiving user data from the wireless device at a host computer according to some embodiments of the present disclosure.

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 9:
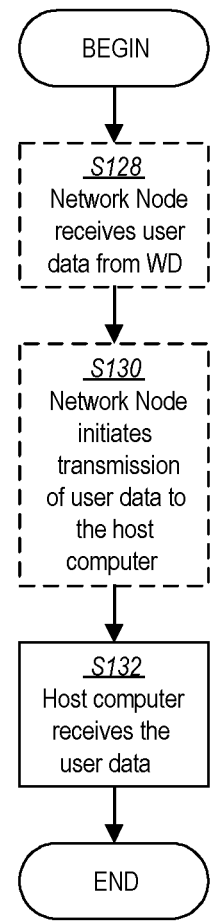
FIG. 9 is a flowchart illustrating example methods implemented in a communication system including a host computer, a network node and a wireless device for receiving user data at a host computer according to some embodiments of the present disclosure.

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
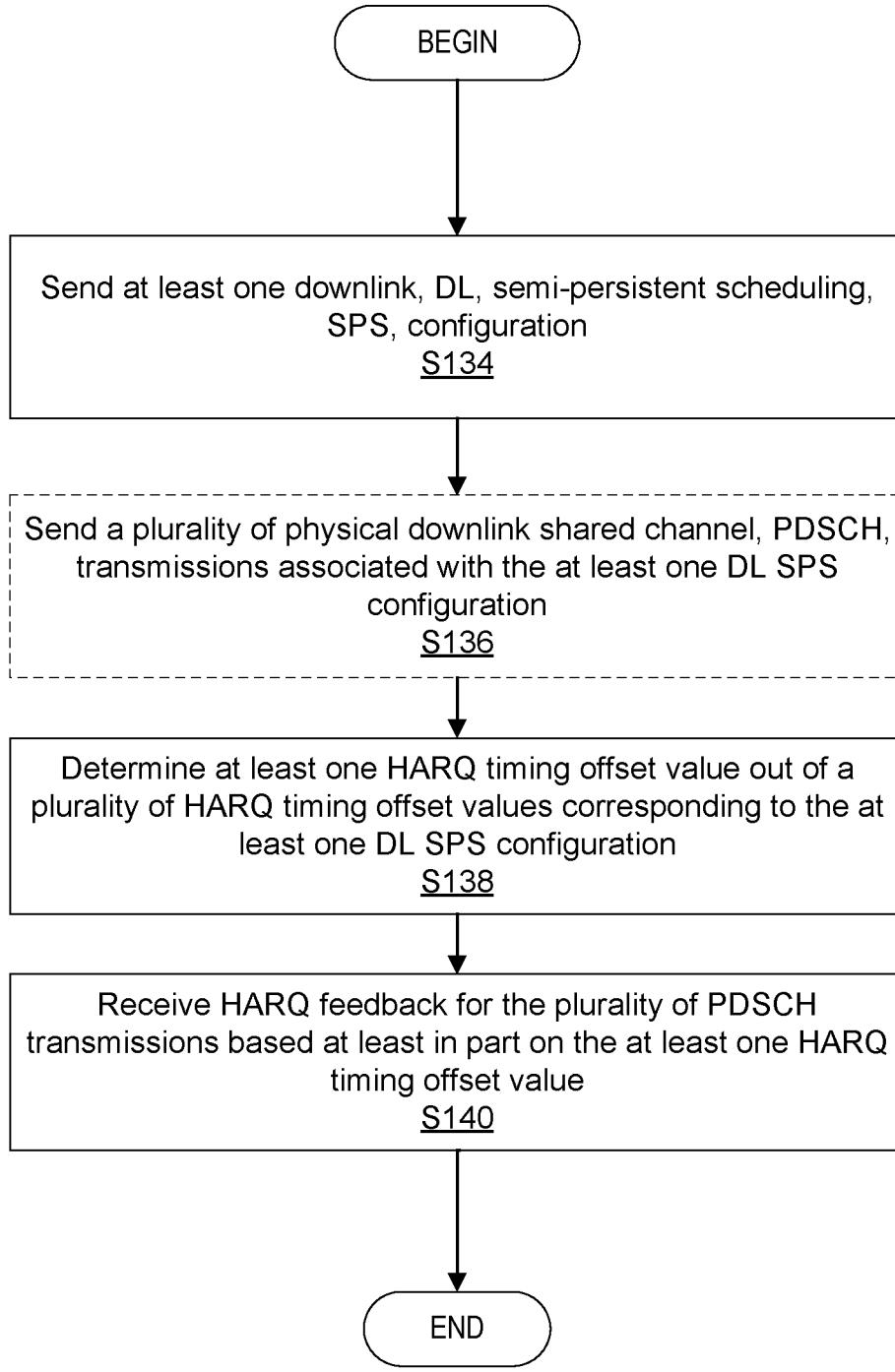
FIG. 10 is a flowchart of an example process in a network node for configuration unit according to some embodiments of the present disclosure.

FIG. 10 is a flowchart of an exemplary process in a network node 16 for HARQ feedback for DL SPS according to some embodiments of the present disclosure. One or more Blocks and/or functions and/or processes performed by the network node 16 may be performed by one or more elements of network node 16 such as by configuration unit 32 in processing circuitry 68, processor 70, communication interface 60, radio interface 62, etc., according to the example process. The example process includes sending (Block S134), such as via configuration unit 32, processing circuitry 68, processor 70, communication interface 60 and/or radio interface 62, at least one downlink, DL, semi-persistent scheduling, SPS, configuration. The process includes optionally, sending (Block S136), such as via configuration unit 32, processing circuitry 68, processor 70, communication interface 60 and/or radio interface 62, a plurality of physical downlink shared channel, PDSCH, transmissions associated with the at least one DL SPS configuration. The process includes determining (Block S138), such as via configuration unit 32, processing circuitry 68, processor 70, communication interface 60 and/or radio interface 62, at least one HARQ timing offset value out of a plurality of HARQ timing offset values corresponding to the at least one DL SPS configuration. The process includes receiving (Block S140), such as via configuration unit 32, processing circuitry 68, processor 70, communication interface 60 and/or radio interface 62, HARQ feedback for the plurality of PDSCH transmissions based at least in part on the at least one HARQ timing offset value.

In some embodiments, a periodicity of at least one of the at least one DL SPS configuration is at least one of: two or more orthogonal frequency division multiplexing, OFDM, symbols; and less than 10 milliseconds. In some embodiments, the HARQ feedback is for the plurality of PDSCH transmissions within a single slot. In some embodiments, the at least one DL SPS configuration includes a plurality of DL SPS configurations, each of the plurality of DL SPS configurations corresponding to a different HARQ timing offset value. In some embodiments, the at least one DL SPS configuration includes a plurality of sub-sets of DL SPS transmission opportunities, each of the plurality of sub-sets of DL SPS transmission opportunities corresponding to a different HARQ timing offset value. In some embodiments, the at least one DL SPS configuration includes a plurality of bitmaps, each of the plurality of bitmaps associated with a different HARQ timing offset value.

In some embodiments, determining the at least one HARQ timing offset value includes determining, such as via configuration unit 32, processing circuitry 68, processor 70, communication interface 60 and/or radio interface 62, the at least one HARQ timing offset value based at least in part on a HARQ timing offset value for a last PDSCH within a PDSCH window. In some embodiments, determining the at least one HARQ timing offset value further includes determining, such as via configuration unit 32, processing circuitry 68, processor 70, communication interface 60 and/or radio interface 62, the at least one HARQ timing offset value based at least in part on at least one HARQ timing offset value for at least one earlier PDSCH within the PDSCH window being disregarded.

In some embodiments, receiving HARQ feedback further includes determining, such as via configuration unit 32, processing circuitry 68, processor 70, communication interface 60 and/or radio interface 62, whether the at least one HARQ timing offset value indicates a DL slot and if the at least one HARQ timing offset value indicates the DL slot, postponing receiving the HARQ feedback until a first slot with an UL allocation. In some embodiments, the method further includes indicating, such as via configuration unit 32, processing circuitry 68, processor 70, communication interface 60 and/or radio interface 62, the at least one HARQ timing offset value via one of radio resource control (RRC) signaling and at least one downlink control information (DCI) message.

In some embodiments, the process includes sending, such as via configuration unit 32, processing circuitry 68, and/or radio interface 62, at least one downlink (DL) semi-persistent scheduling (SPS) configuration corresponding to at least one Hybrid Automatic Repeat reQuest (HARQ) timing offset value. The process optionally includes sending, such as via configuration unit 32, processing circuitry 68, and/or radio interface 62, at least one physical downlink shared channel (PDSCH) associated with the at least one DL SPS configuration. The process includes receiving, such as via configuration unit 32, processing circuitry 68, and/or radio interface 62, HARQ feedback according to one or more of the at least one DL SPS configuration and the at least one HARQ timing offset value.

In some embodiments, the at least one DL SPS configuration comprises a plurality of DL SPS configurations, each of the plurality of DL SPS configurations corresponding to a different HARQ timing offset value. In some embodiments, the at least one DL SPS configuration comprises a plurality of sub-sets of DL SPS transmission opportunities, each of the plurality of sub-sets of DL SPS transmission opportunities corresponding to a different HARQ timing offset value. In some embodiments, the at least one DL SPS configuration indicates at least one bitmap, each of the at least one bitmap associated with a different HARQ timing offset value. In some embodiments, the at least one HARQ timing offset value is derived based at least in part on a HARQ timing offset value for a last PDSCH within a PDSCH window and disregarding HARQ timing offset values for earlier PDSCHs within the PDSCH window. In some embodiments, if the at least one HARQ timing offset value indicates a DL slot, the HARQ feedback is received in a first slot with an UL allocation. In some embodiments, the HARQ feedback comprises multiplexed HARQ feedback for a plurality of PDSCHs associated with the at least one DL SPS configuration.

In some embodiments, the at least one DL SPS configuration is sent, such as via configuration unit 32, processing circuitry 68, and/or radio interface 62, via one of radio resource control (RRC) signaling and a downlink control information (DCI) message. In some embodiments, the at least one DL SPS configuration configures, such as via configuration unit 32, processing circuitry 68, and/or radio interface 62, at least one periodicity for the at least one PDSCH. In some embodiments, the at least one periodicity is less than 10 milliseconds.

Figure 11:
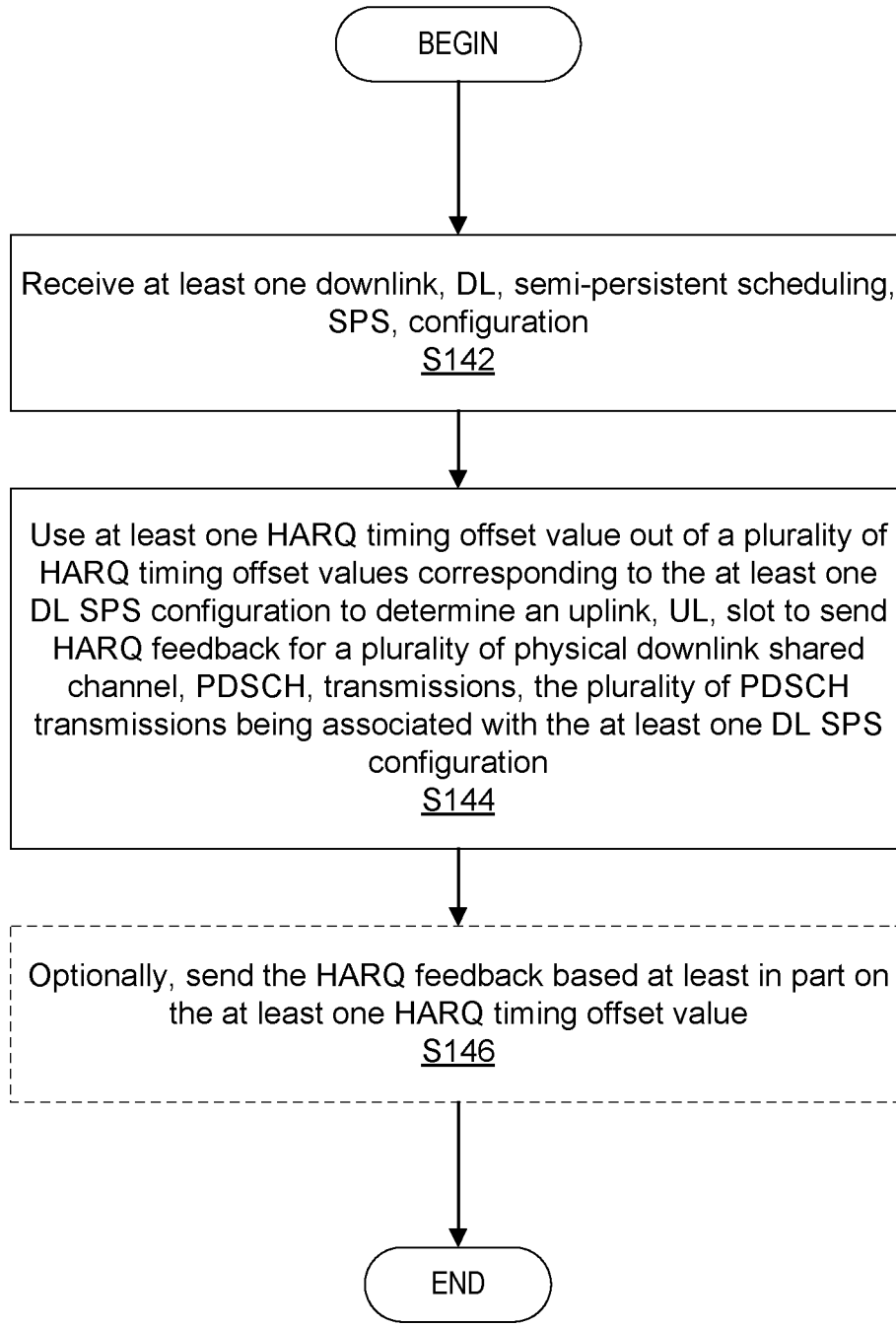
FIG. 11 is a flowchart of an example process in a wireless device for feedback unit according to some embodiments of the present disclosure.

FIG. 11 is a flowchart of an exemplary process in a wireless device 22 for HARQ feedback for DL SPS according to some embodiments of the present disclosure. One or more Blocks and/or functions and/or processes performed by WD 22 may be performed by one or more elements of WD 22 such as by feedback unit 34 in processing circuitry 84, processor 86, radio interface 82, etc. The example process includes receiving (Block S142), such as via feedback unit 34, processing circuitry 84, processor 86 and/or radio interface 82, at least one downlink, DL, semi-persistent scheduling, SPS, configuration. The process includes using (Block S144), such as via feedback unit 34, processing circuitry 84, processor 86 and/or radio interface 82, at least one HARQ timing offset value out of a plurality of HARQ timing offset values corresponding to the at least one DL SPS configuration to determine an uplink, UL, slot to send HARQ feedback for a plurality of physical downlink shared channel, PDSCH, transmissions, the plurality of PDSCH transmissions being associated with the at least one DL SPS configuration. The process includes optionally, sending (Block S146), such as via feedback unit 34, processing circuitry 84, processor 86 and/or radio interface 82, the HARQ feedback based at least in part on the at least one HARQ timing offset value.

In some embodiments, a periodicity of at least one of the at least one DL SPS configuration is at least one of: two or more orthogonal frequency division multiplexing, OFDM, symbols; and less than 10 milliseconds. In some embodiments, the HARQ feedback is for the plurality of PDSCH transmissions within a single slot. In some embodiments, the at least one DL SPS configuration includes a plurality of DL SPS configurations, each of the plurality of DL SPS configurations corresponding to a different HARQ timing offset value. In some embodiments, the at least one DL SPS configuration includes a plurality of sub-sets of DL SPS transmission opportunities, each of the plurality of sub-sets of DL SPS transmission opportunities corresponding to a different HARQ timing offset value. In some embodiments, the at least one DL SPS configuration includes a plurality of bitmaps, each of the plurality of bitmaps associated with a different HARQ timing offset value.

In some embodiments, using the at least one HARQ timing offset value includes determining, such as via feedback unit 34, processing circuitry 84, processor 86 and/or radio interface 82, the at least one HARQ timing offset value based at least in part on a HARQ timing offset value for a last PDSCH within a PDSCH window. In some embodiments, using the at least one HARQ timing offset value further includes disregarding, such as via feedback unit 34, processing circuitry 84, processor 86 and/or radio interface 82, at least one HARQ timing offset value for at least one earlier PDSCH within the PDSCH window. In some embodiments, using the at least one HARQ timing offset value includes determining, such as via feedback unit 34, processing circuitry 84, processor 86 and/or radio interface 82, whether the at least one HARQ timing offset value indicates a DL slot and if the at least one HARQ timing offset value indicates the DL slot, postponing sending the HARQ feedback until a first slot with an UL allocation. In some embodiments, the at least one HARQ timing offset value is indicated via one of radio resource control (RRC) signaling and at least one downlink control information (DCI) message.

In some embodiments, the process includes receiving, such as via feedback unit 34, processing circuitry 84, and/or radio interface 82, at least one downlink (DL) semi-persistent scheduling (SPS) configuration corresponding to at least one Hybrid Automatic Repeat reQuest (HARQ) timing offset value. The process includes using, such as via feedback unit 34, processing circuitry 84, and/or radio interface 82, the at least one HARQ timing offset value to determine an uplink (UL) slot to send HARQ feedback for at least one physical downlink shared channel (PDSCH) associated with the at least one DL SPS configuration. The process includes optionally, sending, such as via feedback unit 34, processing circuitry 84, and/or radio interface 82, the HARQ feedback according to one or more of the at least one DL SPS configuration and the at least one HARQ timing offset value.

In some embodiments, the at least one DL SPS configuration comprises a plurality of DL SPS configurations, each of the plurality of DL SPS configurations corresponding to a different HARQ timing offset value. In some embodiments, the at least one DL SPS configuration comprises a plurality of sub-sets of DL SPS transmission opportunities, each of the plurality of sub-sets of DL SPS transmission opportunities corresponding to a different HARQ timing offset value. In some embodiments, the at least one DL SPS configuration indicates at least one bitmap, each of the at least one bitmap associated with a different HARQ timing offset value. In some embodiments, use of the at least one HARQ timing offset value comprises deriving, such as via feedback unit 34, processing circuitry 84, and/or radio interface 82, the at least one HARQ timing offset value based at least in part on a HARQ timing offset value for a last PDSCH within a PDSCH window and disregarding, such as via feedback unit 34, processing circuitry 84, and/or radio interface 82, HARQ timing offset values for earlier PDSCHs within the PDSCH window. In some embodiments, use of the at least one HARQ timing offset value comprises determining, such as via feedback unit 34, processing circuitry 84, and/or radio interface 82, whether the at least one HARQ timing offset value indicates a DL slot and if the at least one HARQ timing offset value indicates the DL slot, postponing sending the HARQ feedback until a first slot with an UL allocation. In some embodiments, the HARQ feedback comprises multiplexed HARQ feedback for a plurality of PDSCHs associated with the at least one DL SPS configuration.

In some embodiments, the at least one DL SPS configuration is received, such as via feedback unit 34, processing circuitry 84, and/or radio interface 82, via one of radio resource control (RRC) signaling and a downlink control information (DCI) message. In some embodiments, the at least one DL SPS configuration configures at least one periodicity for the at least one PDSCH. In some embodiments, the at least one periodicity is less than 10 milliseconds.

Having described the general process flow of arrangements of the disclosure and having provided examples of hardware and software arrangements for implementing the processes and functions of the disclosure, and which may be implemented by the network node 16, wireless device 22 and/or host computer 24, the sections below provide details and examples of arrangements for HARQ feedback for multiple PDSCH with downlink (DL) semi-persistent scheduling (SPS).

Note that although the examples herein may be described in terms of slots, it should be understood that the techniques may be applied to other types of resources, such as, for example, mini-slots, symbols, transmission interval, other types of radio communication resources and the like. In some embodiments, the terms "slot", "mini-slot", and the like may be used interchangeably.

Configuring Multiple DL SPS Configurations Corresponding to Different K1 Values

According to one embodiment of the present disclosure, multiple DL SPS configurations are configured, where the different configurations have different K1/HARQ feedback timing offset values. Each configuration is used to provide feedback for a certain PDSCH-to-HARQ offset. Each of the multiple configurations can have the same or different periodicities. Moreover, the PUCCH resource for DL SPS HARQ-ACK transmission is common among multiple configurations. Multiple configurations may be activated simultaneously or activated consecutively to effectively provide the intended/target/effective new periodicity.

Figure 12:
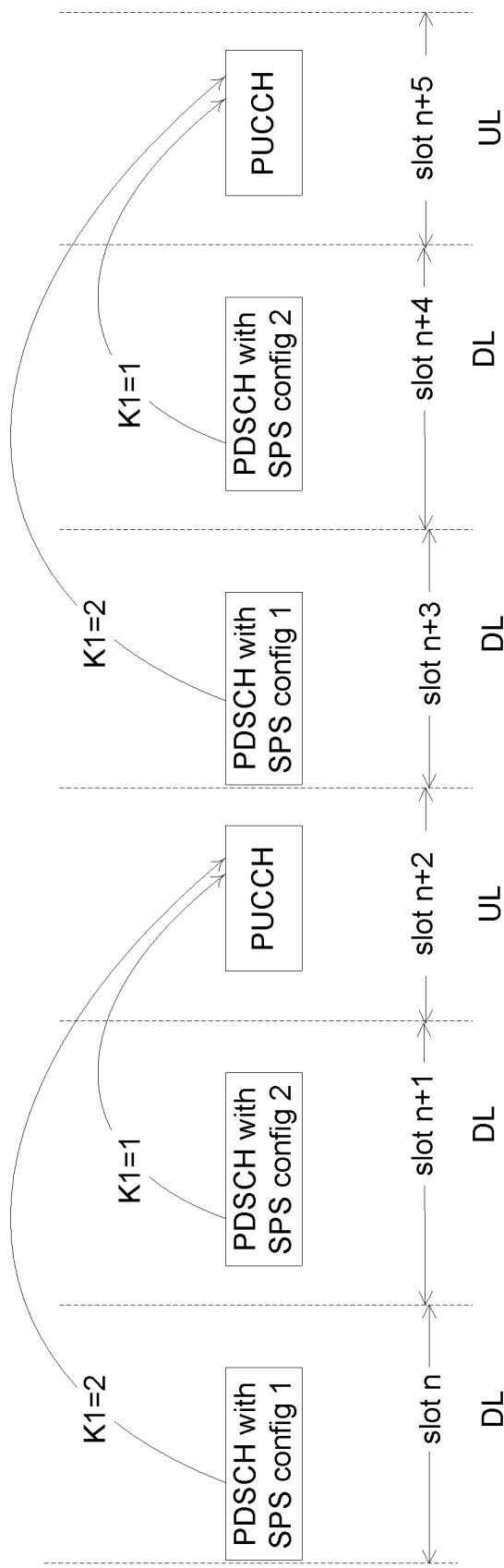
FIG. 12 illustrates an example of two consecutive DL SPS with two different SPS configurations with different K1 values to enable a DL SPS with periodicity of one slot, according to some embodiments of the present disclosure.

The example shown in FIG. 12 illustrates a TDD scenario with two consecutive DL and one UL slot. In order to have a DL SPS PDSCH in every DL slot, two different SPS configurations are used, each with a different K1 value to indicate the corresponding HARQ feedback in the PUCCH in the UL slot. FIG. 12 illustrates DL SPS configurations 1 and 2, each with periodicity of 3 slots and K1=2 and K1=1, respectively. Both K1 values indicate the same PUCCH resource, as illustrated in FIG. 12. By activating DL SPS configuration 1 one slot prior to DL SPS configuration 2, these two configurations together, provide a DL SPS transmission with transmission opportunity in every slot.

In some embodiments, each of the multiple configurations and/or different K1 values may be provided (e.g., by network node 16) in DCI (activating the DL SPS PDSCH) and/or RRC signaling.

DL SPS Configuration Including Sub-Sets of DL SPS Transmission Opportunities

In another embodiment of the present disclosure, a method of configuration of a DL SPS with the intended new periodicities with a PUCCH resource for transmission of DL SPS HARQ-ACK feedback is provided. In some aspects, the configuration (e.g., by network node 16) includes different sub-sets of transmission opportunities with a corresponding K1 value.

Figure 13:
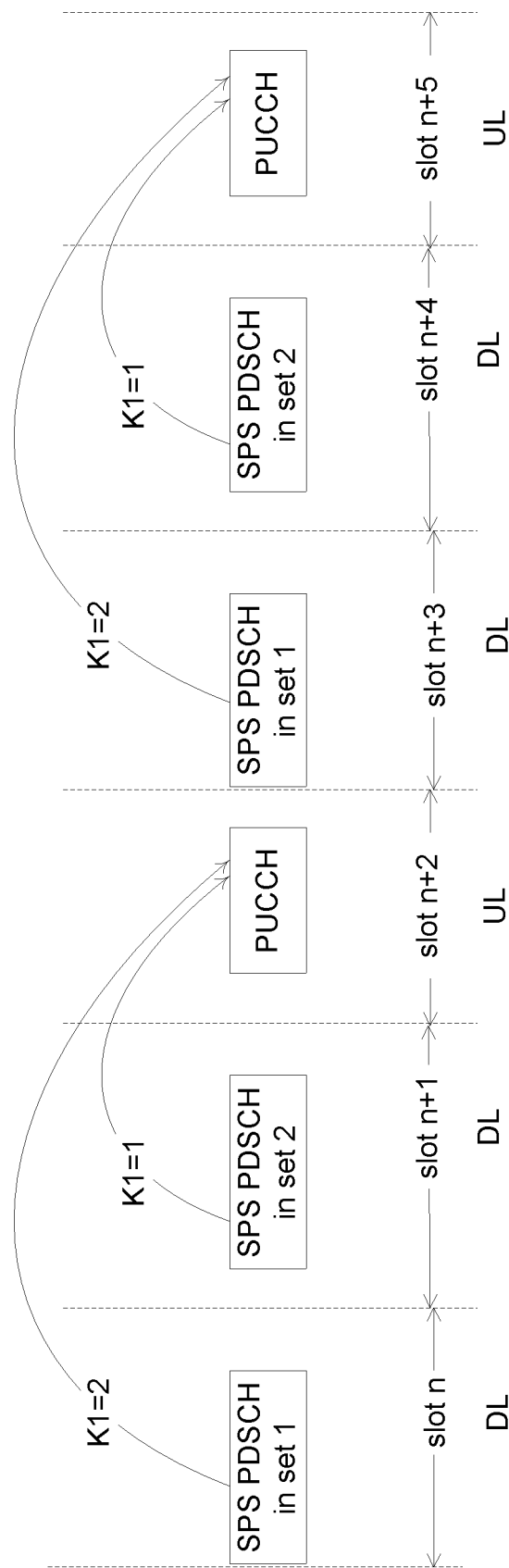
FIG. 13 illustrates an example of a DL SPS with two sets of transmission opportunities that are interleaved with different K1 values to enable a DL SPS with periodicity of one slot, according to some embodiments of the present disclosure.

Another example is shown in FIG. 13, which illustrates a TDD scenario with two consecutive DL and one UL slot. In order to have a DL SPS in every DL slot, the DL SPS is configured with periodicity of one slot and a PUCCH resource. However, the configuration includes parameters for set 1 with K1=2 and set 2 with K1=1 where every transmission opportunity of set 1 is followed by a transmission opportunity of set 2. FIG. 13 illustrates an example of a DL SPS with two sets of transmission opportunities that are interleaved with different K1 values to enable a DL SPS with periodicity of one slot.

Bitmap Patterns Corresponding to Different K1 Offsets

Yet another embodiment of the present disclosure includes an arrangement for constructing different bitmap patterns where each bitmap corresponds to different K1 offsets. The bitmaps may indicate which slots should get certain K1 values.

Figure 14:
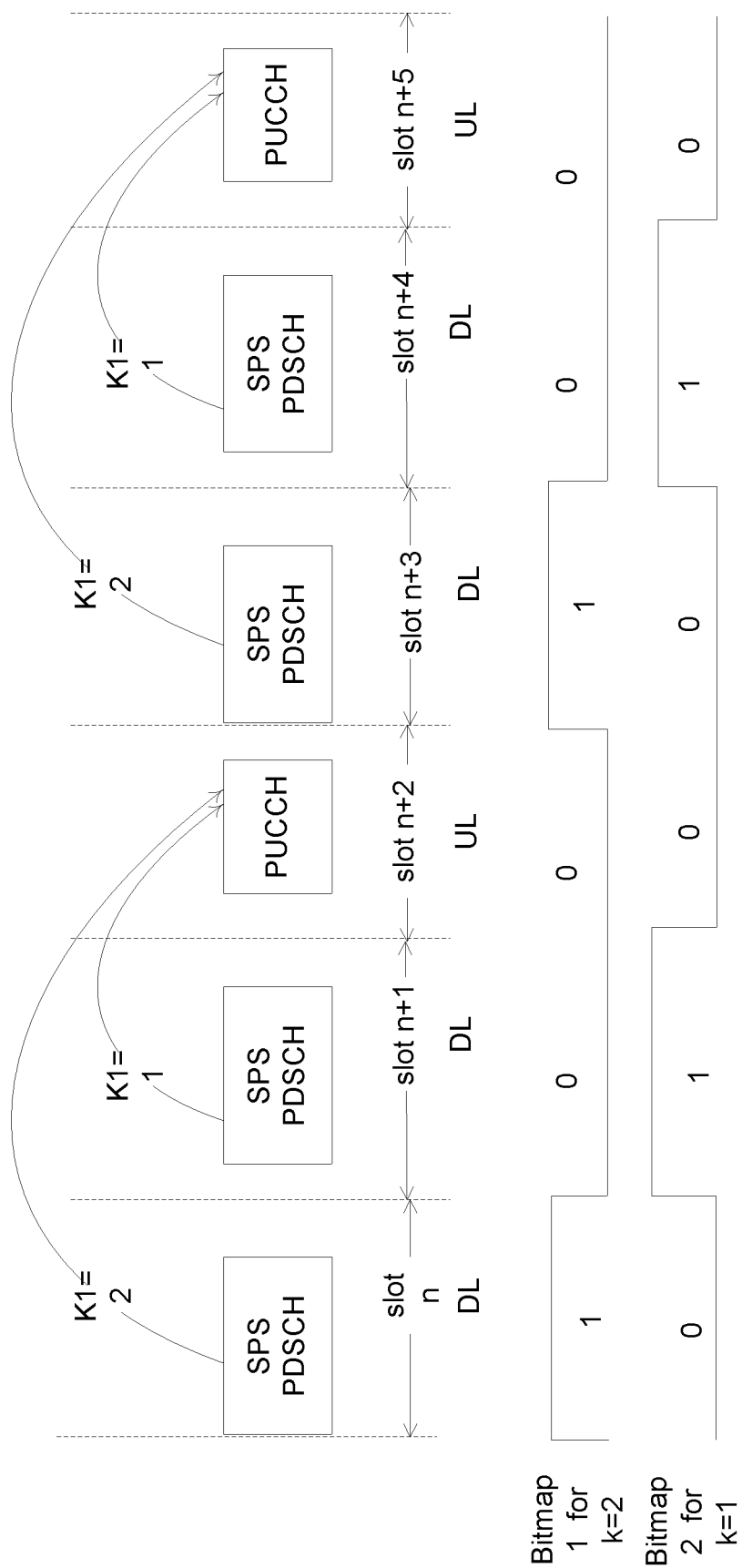
FIG. 14 illustrates an example of two consecutive DL SPS with two different bitmaps which applies different K1 values to different slots, according to some embodiments of the present disclosure.

FIG. 14 shows an example of two consecutive DL slots and a following UL slot. All slots where bitmap1=1 use a K1=2 value for PDSCH-to-HARQ offset and all slots where bitmap2=1 use K1=1 for PDSCH-to-HARQ offset. Thus, FIG. 14 illustrates two different bitmaps being used to apply different K1 values to different slots.

Another way to implement the above method is to configure (e.g., network node 16 configures WD 22) a vector where each vector element is associated with an SPS configuration. The value of the vector element can specify the K1 value to be used for the associated SPS configuration.

Deriving PDSCH-to-HARQ Offset Based on the Latest PDSCH

Yet another embodiment of the present disclosure provides an arrangement for determining the slot for feedback based on the K1 value for the latest/most recent PDSCH in aggregated DL slots (PDSCH window) that determine the corresponding HARQ associated with the PDSCH window. In this arrangement, all the K1 values corresponding to earlier PDSCHs in the "HARQ associated PDSCH window" may be disregarded/ignored. HARQ feedback is reported in slot n+K1 with K1 from the last SPS transmission opportunity in the HARQ associated PDSCH window and n being the slot number of the last slot in the window. The HARQ associated window can be determined (e.g., by WD 22 and/or network node 16) as part of the DL SPS configuration. This can be achieved by defining a periodicity for the HARQ associated window, or by configuring a window length in number of consecutive symbols or number of consecutive slots.

Figure 15:
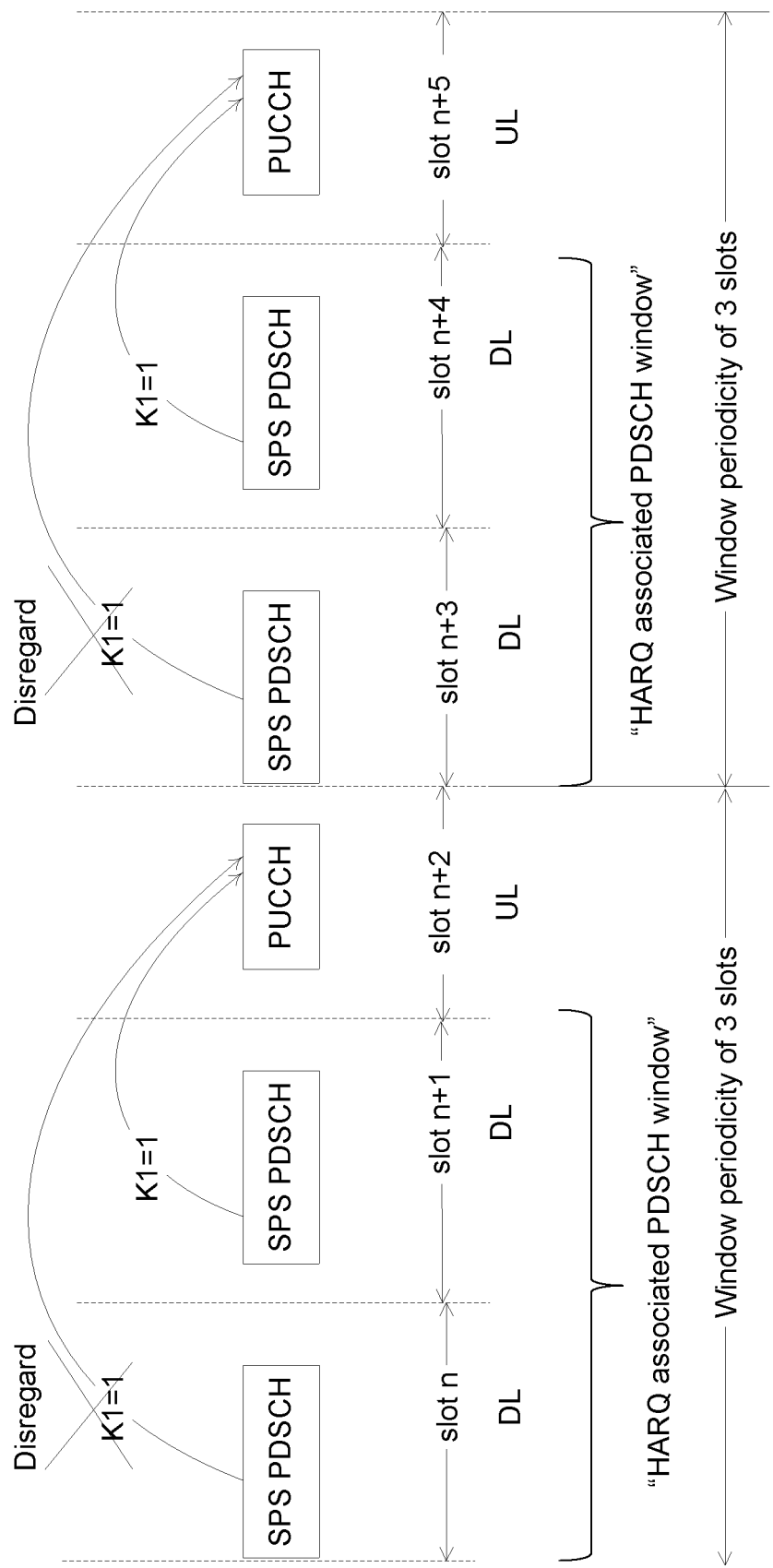
FIG. 15 illustrates an example of two consecutive DL SPS where the last K1 is used for HARQ feedback and the earlier K1 values are disregarded, according to some embodiments of the present disclosure.

FIG. 15 shows an example of two consecutive DL slots and one following UL slot, where the two DL are considered as one "HARQ associated PDSCH window" of DL and all the HARQ feedback of the SPS PDSCHs within the "window" are sent according to the PDSCH-to-HARQ indication in the last PDSCH in the "window". All of the earlier PDSCH-to-HARQ indications are disregarded. In this example, either the configuration of DL SPS of periodicity of one slot, includes a HARQ associated with a PDSCH window of duration of 2 slots, or a window of periodicity of 3 slots (including only DL slots). Thus, FIG. 15 illustrates one example of two consecutive DL SPS where the last K1 is used for HARQ feedback timing and the earlier K1 values are disregarded.

It is noted that, in cases of SPS configurations having a periodicity less than a slot, the "HARQ associated PDSCH window" could actually be smaller than a slot, and there may be more than one window with different sizes to cover a slot. For example, in one embodiment, assume a SPS configuration with a periodicity of 2 symbols, i.e., seven SPS PDSCH transmissions/occurrences within a slot of 14 symbols. The first window could in this case includes symbol 0 to 5 covering the first three SPS occurrences and the second window could include symbols 6 to 13 covering the last four SPS occurrences. In this example, the HARQ feedback for the first window is reported in slot n+K1_of_third_SPS_in_slot and HARQ feedback for the second window is reported in slot n+K1_of_seventh_SPS_in_slot. Note, in case sub-slots are introduced in UL to enable multiple PUCCHs per slot (one PUCCH per window) n could be replaced by n1 (for the first window) and n2 (for the second window), with n1 and n2 being the UL slot number overlapping the first and second windows, respectively.

In an embodiment, the DL SPS configuration includes configurations of consecutive windows with different durations. The consecutive windows may repeat periodically to match the occurrence of the PUCCH transmission.

Rule Based on TDD Pattern

When a WD 22 is configured (by network node 16) with a TDD pattern and a single SPS configuration with SPS PDSCH transmissions/occurrences every slot (i.e., periodicity equal to or smaller than one slot) a single K1 value will point to DL slots to be used for PUCCH for some slots. For example, HARQ feedback for SPS in slot n is reported in slot n+K1, however, in TDD this slot may be a DL slot. In some embodiments, a rule may specify that, for example, if slot n+K1 is a DL slot, PUCCH is postponed until the first slot with UL allocation. The next UL slot with UL allocation could be specified to be a full UL slot, or a slot which UL allocation does not contradict the PUCCH resource to be used.

Some embodiments may include one or more of the following:

Embodiment A1. A network node configured to communicate with a wireless device (WD), the network node configured to, and/or comprising a radio interface and/or comprising processing circuitry configured to:
- send at least one downlink (DL) semi-persistent scheduling (SPS) configuration corresponding to at least one Hybrid Automatic Repeat reQuest (HARQ) timing offset value;
- optionally, send at least one physical downlink shared channel (PDSCH) associated with the at least one DL SPS configuration; and
- receive HARQ feedback according to one or more of the at least one DL SPS configuration and the at least one HARQ timing offset value.

Embodiment A2. The network node of Embodiment A1, wherein one or more of:
- the at least one DL SPS configuration comprises a plurality of DL SPS configurations, each of the plurality of DL SPS configurations corresponding to a different HARQ timing offset value;
- the at least one DL SPS configuration comprises a plurality of sub-sets of DL SPS transmission opportunities, each of the plurality of sub-sets of DL SPS transmission opportunities corresponding to a different HARQ timing offset value;
- the at least one DL SPS configuration indicates at least one bitmap, each of the at least one bitmap associated with a different HARQ timing offset value;
- the at least one HARQ timing offset value is derived based at least in part on a HARQ timing offset value for a last PDSCH within a PDSCH window and disregarding HARQ timing offset values for earlier PDSCHs within the PDSCH window;
- if the at least one HARQ timing offset value indicates a DL slot, receive the HARQ feedback in a first slot with an UL allocation; and
- the HARQ feedback comprises multiplexed HARQ feedback for a plurality of PDSCHs associated with the at least one DL SPS configuration.

Embodiment A3. The network node of any one of Embodiments A1 and A2, wherein the at least one DL SPS configuration is sent via one of radio resource control (RRC) signaling and a downlink control information (DCI) message.

Embodiment A4. The network node of any one of Embodiments A1-A4, wherein one or more of:
- the at least one DL SPS configuration configures at least one periodicity for the at least one PDSCH; and
- the at least one periodicity is less than 10 milliseconds.

Embodiment B1. A method implemented in a network node, the method comprising:
- sending at least one downlink (DL) semi-persistent scheduling (SPS) configuration corresponding to at least one Hybrid Automatic Repeat reQuest (HARQ) timing offset value;
- optionally, sending at least one physical downlink shared channel (PDSCH) associated with the at least one DL SPS configuration; and
- receiving HARQ feedback according to one or more of the at least one DL SPS configuration and the at least one HARQ timing offset value.

Embodiment B2. The method of Embodiment B1, wherein one or more of:
- the at least one DL SPS configuration comprises a plurality of DL SPS configurations, each of the plurality of DL SPS configurations corresponding to a different HARQ timing offset value;
- the at least one DL SPS configuration comprises a plurality of sub-sets of DL SPS transmission opportunities, each of the plurality of sub-sets of DL SPS transmission opportunities corresponding to a different HARQ timing offset value;
- the at least one DL SPS configuration indicates at least one bitmap, each of the at least one bitmap associated with a different HARQ timing offset value;
- the at least one HARQ timing offset value is derived based at least in part on a HARQ timing offset value for a last PDSCH within a PDSCH window and disregarding HARQ timing offset values for earlier PDSCHs within the PDSCH window;
- if the at least one HARQ timing offset value indicates a DL slot, receive the HARQ feedback in a first slot with an UL allocation; and
- the HARQ feedback comprises multiplexed HARQ feedback for a plurality of PDSCHs associated with the at least one DL SPS configuration.

Embodiment B3. The method of any one of Embodiments B1 and B2, wherein the at least one DL SPS configuration is sent via one of radio resource control (RRC) signaling and a downlink control information (DCI) message.

Embodiment B4. The method of any one of Embodiments B1-B4, wherein one or more of:
- the at least one DL SPS configuration configures at least one periodicity for the at least one PDSCH; and
- the at least one periodicity is less than 10 milliseconds.

Embodiment C1. A wireless device (WD) configured to communicate with a network node, the WD configured to, and/or comprising a radio interface and/or processing circuitry configured to:
- receive at least one downlink (DL) semi-persistent scheduling (SPS) configuration corresponding to at least one Hybrid Automatic Repeat reQuest (HARQ) timing offset value;
- use the at least one HARQ timing offset value to determine an uplink (UL) slot to send HARQ feedback for at least one physical downlink shared channel (PDSCH) associated with the at least one DL SPS configuration; and
- optionally, send the HARQ feedback according to one or more of the at least one DL SPS configuration and the at least one HARQ timing offset value.

Embodiment C2. The WD of Embodiment C1, wherein one or more of:
- the at least one DL SPS configuration comprises a plurality of DL SPS configurations, each of the plurality of DL SPS configurations corresponding to a different HARQ timing offset value;
- the at least one DL SPS configuration comprises a plurality of sub-sets of DL SPS transmission opportunities, each of the plurality of sub-sets of DL SPS transmission opportunities corresponding to a different HARQ timing offset value;
- the at least one DL SPS configuration indicates at least one bitmap, each of the at least one bitmap associated with a different HARQ timing offset value;

use of the at least one HARQ timing offset value comprises deriving the at least one HARQ timing offset value based at least in part on a HARQ timing offset value for a last PDSCH within a PDSCH window and disregarding HARQ timing offset values for earlier PDSCHs within the PDSCH window;

use of the at least one HARQ timing offset value comprises determining whether the at least one HARQ timing offset value indicates a DL slot and if the at least one HARQ timing offset value indicates the DL slot, postponing sending the HARQ feedback until a first slot with an UL allocation; and the HARQ feedback comprises multiplexed HARQ feedback for a plurality of PDSCHs associated with the at least one DL SPS configuration.

Embodiment C3. The WD of any one of Embodiments C1 and C2, wherein the at least one DL SPS configuration is received via one of radio resource control (RRC) signaling and a downlink control information (DCI) message.

Embodiment C4. The WD of any one of Embodiments C1-C4, wherein one or more of:

the at least one DL SPS configuration configures at least one periodicity for the at least one PDSCH; and the at least one periodicity is less than 10 milliseconds.

Embodiment D1. A method implemented in a wireless device (WD), the method comprising:

receiving at least one downlink (DL) semi-persistent scheduling (SPS) configuration corresponding to at least one Hybrid Automatic Repeat reQuest (HARQ) timing offset value;

using the at least one HARQ timing offset value to determine an uplink (UL) slot to send HARQ feedback for at least one physical downlink shared channel (PDSCH) associated with the at least one DL SPS configuration; and optionally, sending the HARQ feedback according to one or more of the at least one DL SPS configuration and the at least one HARQ timing offset value.

Embodiment D2. The method of Embodiment D1, wherein one or more of:

the at least one DL SPS configuration comprises a plurality of DL SPS configurations, each of the plurality of DL SPS configurations corresponding to a different HARQ timing offset value;

the at least one DL SPS configuration comprises a plurality of sub-sets of DL SPS transmission opportunities, each of the plurality of sub-sets of DL SPS transmission opportunities corresponding to a different HARQ timing offset value;

the at least one DL SPS configuration indicates at least one bitmap, each of the at least one bitmap associated with a different HARQ timing offset value;

use of the at least one HARQ timing offset value comprises deriving the at least one HARQ timing offset value based at least in part on a HARQ timing offset value for a last PDSCH within a PDSCH window and disregarding HARQ timing offset values for earlier PDSCHs within the PDSCH window; and use of the at least one HARQ timing offset value comprises determining whether the at least one HARQ timing offset value indicates a DL slot and if the at least one HARQ timing offset value indicates the DL slot, postponing sending the HARQ feedback until a first slot with an UL allocation.

Embodiment D3. The method of any one of Embodiments D1 and D2, wherein the at least one DL SPS configuration is received via one of radio resource control (RRC) signaling and a downlink control information (DCI) message.

Embodiment D4. The method of any one of Embodiments D1-D4, wherein one or more of:

the at least one DL SPS configuration configures at least one periodicity for the at least one PDSCH; and the at least one periodicity is less than 10 milliseconds.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| eMBB | enhanced Mobile BroadBand |
| LTE | Long Term Evolution |
| MTC | Machine Type Communication |
| NR | Next Radio |
| PUCCH | Physical Uplink Control Channel |
| PUSCH | Physical Uplink Shared Channel |
| SR | Scheduling Request |
| URLLC | Ultra-Reliable Low Latency Communication (or High-Reliable Low Latency Communication) |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, WD, the method comprising:
   receiving at least one downlink, DL, semi-persistent scheduling, SPS, configuration;
   using at least one HARQ timing offset value out of a plurality of HARQ timing offset values corresponding to the at least one DL SPS configuration to determine an uplink, UL, slot to send HARQ feedback for a plurality of physical downlink shared channel, PDSCH, transmissions, the plurality of PDSCH transmissions being associated with the at least one DL SPS configuration; and
   optionally, sending the HARQ feedback based at least in part on the at least one HARQ timing offset value.

2. The method of claim 1, wherein a periodicity of at least one of the at least one DL SPS configuration is at least one of:
   two or more orthogonal frequency division multiplexing, OFDM, symbols; and
   less than 10 milliseconds.

3. The method of claim 1, wherein the HARQ feedback is for the plurality of PDSCH transmissions within a single slot.

4. The method of claim 1, wherein the at least one DL SPS configuration comprises:
   a plurality of DL SPS configurations, each of the plurality of DL SPS configurations corresponding to a different HARQ timing offset value.

5. The method of claim 1, wherein the at least one DL SPS configuration comprises:
   a plurality of sub-sets of DL SPS transmission opportunities, each of the plurality of sub-sets of DL SPS transmission opportunities corresponding to a different HARQ timing offset value.

6. The method of claim 1, wherein the at least one DL SPS configuration comprises:
   a plurality of bitmaps, each of the plurality of bitmaps associated with a different HARQ timing offset value.

7. The method of claim 1, wherein using the at least one HARQ timing offset value comprises:
   determining the at least one HARQ timing offset value based at least in part on a HARQ timing offset value for a last PDSCH within a PDSCH window.

8. The method of claim 7, wherein using the at least one HARQ timing offset value further comprises:
   disregarding at least one HARQ timing offset value for at least one earlier PDSCH within the PDSCH window.

9. The method of claim 1, wherein using the at least one HARQ timing offset value comprises:
   determining whether the at least one HARQ timing offset value indicates a DL slot and if the at least one HARQ timing offset value indicates the DL slot, postponing sending the HARQ feedback until a first slot with an UL allocation.

10. The method of claim 1, wherein the at least one HARQ timing offset value is indicated via one of radio resource control, RRC, signaling and at least one downlink control information, DCI, message.

11. A method implemented in a network node configured to communicate with a wireless device, WD, the method comprising:
    sending at least one downlink, DL, semi-persistent scheduling, SPS, configuration;
    optionally, sending a plurality of physical downlink shared channel, PDSCH, transmissions associated with the at least one DL SPS configuration;
    determining at least one HARQ timing offset value out of a plurality of HARQ timing offset values corresponding to the at least one DL SPS configuration; and
    receiving HARQ feedback for the plurality of PDSCH transmissions based at least in part on the at least one HARQ timing offset value.

12. The method of claim 11, wherein a periodicity of at least one of the at least one DL SPS configuration is at least one of:
    two or more orthogonal frequency division multiplexing, OFDM, symbols; and
    less than 10 milliseconds.

13. The method of claim 11, wherein the HARQ feedback is for the plurality of PDSCH transmissions within a single slot.

14. The method of claim 11, wherein the at least one DL SPS configuration comprises:
   a plurality of DL SPS configurations, each of the plurality of DL SPS configurations corresponding to a different HARQ timing offset value.

15. The method of claim 11, wherein the at least one DL SPS configuration comprises:
   a plurality of sub-sets of DL SPS transmission opportunities, each of the plurality of sub-sets of DL SPS transmission opportunities corresponding to a different HARQ timing offset value.

16. The method of claim 11, wherein the at least one DL SPS configuration comprises:
   a plurality of bitmaps, each of the plurality of bitmaps associated with a different HARQ timing offset value.

17. The method of claim 11, wherein determining the at least one HARQ timing offset value comprises:
   determining the at least one HARQ timing offset value based at least in part on a HARQ timing offset value for a last PDSCH within a PDSCH window.

18. The method of claim 17, wherein determining the at least one HARQ timing offset value further comprises:
   determining the at least one HARQ timing offset value based at least in part on at least one HARQ timing offset value for at least one earlier PDSCH within the PDSCH window being disregarded.

19. The method of claim 11, wherein receiving HARQ feedback further comprises:
   determining whether the at least one HARQ timing offset value indicates a DL slot and if the at least one HARQ timing offset value indicates the DL slot, postponing receiving the HARQ feedback until a first slot with an UL allocation.

20. The method of claim 11, further comprising:
   indicating the at least one HARQ timing offset value via one of radio resource control (RRC) signaling and at least one downlink control information, DCI, message.

21. A wireless device, WD, configured to communicate with a network node, the WD comprising processing circuitry, the processing circuitry configured to cause the WD to:
   receive at least one downlink, DL, semi-persistent scheduling, SPS, configuration;
   use at least one HARQ timing offset value out of a plurality of HARQ timing offset values corresponding to the at least one DL SPS configuration to determine an uplink, UL, slot to send HARQ feedback for a plurality of physical downlink shared channel, PDSCH, transmissions, the plurality of PDSCH transmissions being associated with the at least one DL SPS configuration; and
   optionally, send the HARQ feedback based at least in part on the at least one HARQ timing offset value.

22. The WD of claim 21, wherein a periodicity of at least one of the at least one DL SPS configuration is at least one of:
   two or more orthogonal frequency division multiplexing, OFDM, symbols; and
   less than 10 milliseconds.

23. The WD of claim 21, wherein the HARQ feedback is for the plurality of PDSCH transmissions within a single slot.

24. The WD of claim 21, wherein the at least one DL SPS configuration comprises:
   a plurality of DL SPS configurations, each of the plurality of DL SPS configurations corresponding to a different HARQ timing offset value.

25. The WD of claim 21, wherein the at least one DL SPS configuration comprises:
   a plurality of sub-sets of DL SPS transmission opportunities, each of the plurality of sub-sets of DL SPS transmission opportunities corresponding to a different HARQ timing offset value.

26. A network node configured to communicate with a wireless device, WD, the network node comprising processing circuitry, the processing circuitry configured to cause the network node to:
   send at least one downlink, DL, semi-persistent scheduling, SPS, configuration;
   optionally, send a plurality of physical downlink shared channel, PDSCH, transmissions associated with the at least one DL SPS configuration;
   determine at least one HARQ timing offset value out of a plurality of HARQ timing offset values corresponding to the at least one DL SPS configuration; and
   receive HARQ feedback for the plurality of PDSCH transmissions based at least in part on the at least one HARQ timing offset value.

\* \* \* \* \*